(12) United States Patent
El-Najjar et al.

(10) Patent No.: US 9,698,876 B2
(45) Date of Patent: *Jul. 4, 2017

(54) TRANSMISSION MODE ALLOCATION IN LTE NETWORKS

(71) Applicant: Telefonaktiebolaget L M Ericsson (publ), Stockholm (SE)

(72) Inventors: Jad El-Najjar, Montreal (CA); Nader El Chebib, Whitter, CA (US); Monil Joshi, Windsor (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 14/906,460

(22) PCT Filed: Jul. 22, 2014

(86) PCT No.: PCT/IB2014/063322
§ 371 (c)(1),
(2) Date: Jan. 20, 2016

(87) PCT Pub. No.: WO2015/011650
PCT Pub. Date: Jan. 29, 2015

(65) Prior Publication Data
US 2016/0164580 A1 Jun. 9, 2016

Related U.S. Application Data

(63) Continuation of application No. 13/948,680, filed on Jul. 23, 2013, now Pat. No. 9,154,198.

(51) Int. Cl.
*H04B 7/02* (2017.01)
*H04L 1/02* (2006.01)
(Continued)

(52) U.S. Cl.
CPC ......... *H04B 7/0413* (2013.01); *H04B 7/0686* (2013.01); *H04B 7/0691* (2013.01);
(Continued)

(58) Field of Classification Search
CPC .... H04B 7/0689; H04B 7/0413; H04B 17/24; H04B 17/336; H04B 7/0452; H04B 7/0628; H04L 1/0026
(Continued)

(56) References Cited

U.S. PATENT DOCUMENTS 8,159,399 B2   4/2012  Dorsey et al.
2004/0001429 A1  1/2004  Ma et al.
(Continued)

FOREIGN PATENT DOCUMENTS

EP   2469721 A1   6/2012

OTHER PUBLICATIONS

Shandle, J., "Atheros 802.11n chips give PC OEMs performance options, power savings", EE Times Products, Product Brief, Nov. 8, 2007, Web, Jun. 13, 2013, pp. 1-2.
(Continued)

*Primary Examiner* — David S Huang
(74) *Attorney, Agent, or Firm* — Murphy, Bilak & Homiller, PLLC (57) ABSTRACT

The number of active antenna ports used for uplink and/or downlink MIMO transmissions to a given user are dynamically adjusted, based on user data traffic payload size per period of time, and based on RF conditions. An example method, in a radio transceiver that supports two or more MIMO transmission and reception modes, begins with evaluating channel conditions between the radio transceiver and a remote wireless device and comparing a throughput demand for the remote wireless device to a forward link capacity and/or reverse link capacity. A forward link trans-
(Continued)

mission mode or a reverse link transmission mode is changed, based on the channel conditions and the throughput demand. The transmission mode is changed from a first multi-stream mode to a second multi-stream mode having fewer streams than the first multi-stream mode, despite that channel conditions for the corresponding link support the first multi-stream mode.

16 Claims, 5 Drawing Sheets

(51) Int. Cl.
    *H04B 7/0413*     (2017.01)
    *H04W 72/08*     (2009.01)
    *H04B 7/06*     (2006.01)
    *H04B 7/08*     (2006.01)
    *H04W 52/02*     (2009.01)

(52) U.S. Cl.
    CPC ......... *H04B 7/0868* (2013.01); *H04B 7/0874* (2013.01); *H04W 52/0232* (2013.01); *H04W 72/085* (2013.01); *Y02B 60/50* (2013.01)

(58) Field of Classification Search
    USPC .......................................................... 375/267
    See application file for complete search history.

(56) References Cited

U.S. PATENT DOCUMENTS

| | | |
|---|---|---|
| 2006/0084461 A1 | 4/2006 | Sekiya et al. |
| 2007/0160156 A1 | 7/2007 | Melzer et al. |
| 2008/0132281 A1 | 6/2008 | Kim et al. |
| 2010/0166098 A1 | 7/2010 | Luz |
| 2010/0203916 A1 | 8/2010 | Tiwari et al. |
| 2010/0322100 A1 | 12/2010 | Wan et al. |
| 2011/0096727 A1 | 4/2011 | Bergman et al. |
| 2011/0305161 A1 | 12/2011 | Ekpenyong et al. |
| 2013/0058246 A1 | 3/2013 | Li et al. |
| 2014/0086071 A1 | 3/2014 | Hu et al. |

OTHER PUBLICATIONS

Unknown, Author, "IEEE 802.11n", Vocal Technologies Ltd, Vocal, Web, Jun. 13, 2013, 1-5.

FOUR ANTENNA PORTS

TRANSMISSION MODE ALLOCATION IN LTE NETWORKS

TECHNICAL FIELD

The present disclosure generally relates to wireless communications networks and more particularly relates to techniques for selecting among multiple-input multiple-output (MIMO) transmission modes in such networks.

BACKGROUND

Long Term Evolution (LTE) is an emerging fourth-generation (4G) wireless access technology developed by members of the $3^{rd}$-Generation Partnership Project (3GPP). Multiple-Input Multiple-Output (MIMO) transmission techniques are an important enabler of the high data rates sought to be achieved by LTE. An LTE Base Station (known as an eNodeB, or eNB, in 3GPP terminology) is expected to select and switch transmission characteristics of these transmission modes based on a number of radio frequency (RF) signal quality indicators, such as Channel Quality Indicator (CQI), Precoding Matrix Indicator (PMI), Rank Indicator, Block Level Error Rate (BLER), uplink measurements, etc.

However, MIMO activation leads to more battery and resources consumption. Moreover the increased signal (multiple antenna ports used for uplink and/or downlink transmissions) can result in more interference, e.g., to mobile terminals ("user equipment" or "UEs" in 3GPP terminology) that are near a mobile terminal participating in a MIMO transmission. Since users will not be using high data speeds all the time, opportunities are available for optimizing resource consumption and reducing interference while maintaining a high quality UE user experience.

SUMMARY

While multiple-input multiple-output (MIMO) multi-antenna transmission techniques are an important enabler of very high data throughputs in wireless data networks, users of these high-speed wireless data networks will not be using high data speeds all the time. MIMO operation can be optimized, while enhancing the overall user experience, by dynamically and intelligently lowering the number of active antennas ports used for uplink and/or downlink transmissions to a given user, based on user data traffic payload size per period of time, and based on radio frequency (RF) conditions.

An example method according to the techniques disclosed herein is implemented in a radio transceiver that supports two or more MIMO transmission and reception modes. The method begins with evaluating channel conditions between the radio transceiver and a remote wireless device and comparing a throughput demand for the remote wireless device to a forward link capacity or reverse link capacity, or both. The method continues with changing a forward link transmission mode or a reverse link transmission mode, or both, based on the channel conditions and the throughput demand. The transmission mode is changed from a first multi-stream mode to a second multi-stream mode, the second multi-stream mode having fewer streams than the first multi-stream mode, despite that channel conditions for the corresponding link support the first multi-stream mode. In some embodiments, for example, the first multi-stream mode is a four-stream spatial multiplexing mode and the second multi-stream mode is a two-stream spatial multiplexing mode.

In some embodiments, the evaluating of the channel conditions may comprise receiving and evaluating channel quality indicators sent by the remote wireless device, or measuring channel conditions based on reference symbols transmitted by the remote wireless device, or both. This evaluation may consider instantaneous RF conditions, i.e., the conditions applicable to a single subframe or a small group of subframes, or historical RF conditions, e.g., the average conditions for an interval comprising several subframes, or both. Parameters evaluated may include any one or more of Channel Quality Indicators (CQI) sent by the mobile terminal, measured or estimated Block-Error Rates (BLER), and the like.

In some embodiments, the throughput demand is determined by evaluating a forward link buffer corresponding to the remote wireless device, or by receiving and evaluating a buffer status report from the remote wireless device, or both. The forward link capacity or reverse link capacity may be determined based on a modulation and coding scheme (MCS) applicable to the relevant subframe or subframes, in some embodiments.

In some embodiments, changing the forward link transmission mode or the reverse link transmission mode, or both, is based on determining that the throughput demand exceeds a predetermined fraction of a transmission-time-interval capacity. In some of these or in some other embodiments, changing the forward link transmission mode or the reverse link transmission mode, or both, is further based on an aggregate loading of the forward link or reverse link, or both.

In some embodiments, the method summarized above is carried out autonomously by a user equipment (UE), which determines on its own whether to switch transmission modes. In other embodiments, the evaluating and comparing discusses above are carried out at an eNB or other base station, which subsequently directs the transceiver in the UE to change modes. Thus, in some embodiments, the method further comprises signaling the remote wireless device to switch from the first multi-stream mode to the second multi-stream mode for a subsequent reverse link transmission, and subsequently receiving data from the remote wireless device according to the second multi-stream mode.

In some embodiments, an eNB or other base station decides, based on the evaluating and comparing operations discussed above, to change transmission mode for downlink transmissions. This change can be indicated to the UE via a downlink scheduling message. In these or similar embodiments, then, the method may comprise transmitting, to the remote wireless device, a forward link scheduling message indicating the change from the first multi-stream mode to the second multi-stream mode, and transmitting data to the remote wireless device according to the second multi-stream mode.

Corresponding apparatus are also disclosed herein, including an example radio transceiver that comprises RF circuitry configured to support two or more MIMO transmission and reception modes, and a processing circuit. The processing circuit is configured to control the RF circuitry and to: evaluate channel conditions between the radio transceiver and a remote wireless device; compare a throughput demand for the remote wireless device to a forward link capacity or reverse link capacity, or both; and, based on the channel conditions and the throughput demand, change a forward link transmission mode or a reverse link transmission mode, or both, from a first multi-stream mode to a second multi-stream mode, the second multi-stream mode having fewer streams than the first multi-stream mode, despite that channel conditions for the corresponding link support the first multi-stream mode.

Of course, the present invention is not limited to the above features and advantages. Indeed, those skilled in the art will recognize additional features and advantages upon reading the following detailed description, and upon viewing the accompanying drawings.

DETAILED DESCRIPTION

In the discussion that follows, specific details of particular embodiments of the present invention are set forth for purposes of explanation and not limitation. It will be appreciated by those skilled in the art that other embodiments may be employed that differ from these specific embodiments described herein with respect to certain non-essential specific details. Furthermore, in some instances detailed descriptions of well-known methods, nodes, interfaces, circuits, and devices are omitted so as not obscure the description with unnecessary detail.

Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry.

Hardware implementations of the present invention may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions. Moreover, it should be appreciated that the inventive techniques may be embodied within any form of computer-readable memory, including non-transitory embodiments such as solid-state memory, magnetic disk, or optical disk containing an appropriate set of computer instructions that would cause a processor to carry out the techniques described herein.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Finally, it should be noted that the term "antenna port," as used herein, does not necessarily correspond to specific physical antennas. Instead, an antenna port is a more general concept that allows for multi-antenna precoding or beamforming of transmitted signals, for example, in such a manner that the receiving mobile station need not necessarily be aware of how many physical antennas are used or how the transmitted signals were mapped to those physical antennas. Accordingly, the term "antenna port" should be understood according to the sense given to it by LTE specifications, i.e., that if two received signals can be assumed to have experienced the same overall channel, including any joint processing at the transmitter side, then they have been transmitted on the same antenna port. On the downlink, then, an antenna port can be seen as corresponding to the transmission of a reference signal, such that the demodulation of a data transmission from a given antenna port can rely on the corresponding reference signal for channel estimation for coherent demodulation purposes.

Figure 1:
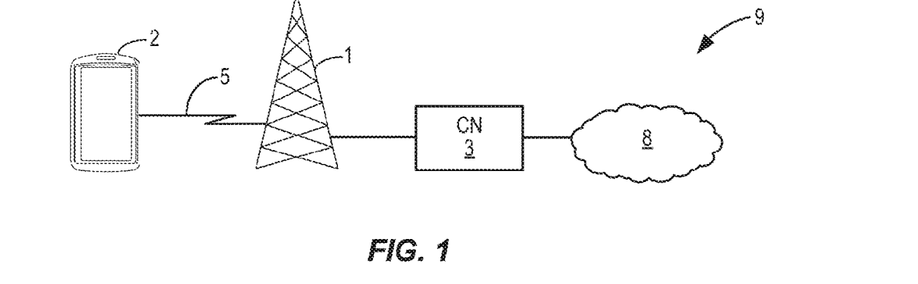
FIG. 1 illustrates an example wireless network in which the techniques described herein may be used.

FIG. 1 is a schematic diagram illustrating an environment where embodiments of the presently disclosed techniques can be applied. As seen in FIG. 1, a mobile communications network 9 comprises a core network 3 and a radio access network comprising one or more radio base stations 1 and optionally one or more radio network controllers (not shown). The radio base stations 1 discussed in detail herein are in the form of so-called evolved Node Bs, also known as eNBs, e.g., as found in an LTE network, but the disclosed techniques may be more generally applicable to other types of base stations, base transceiver stations, etc. The radio base stations 1 provide radio connectivity to a plurality of wireless devices 2. The term wireless device is also known as user equipment (UE), mobile terminal, user terminal, user agent, etc.

Each of the radio base stations 1 provides radio coverage in one or more respective radio cells. Uplink (UL) communication, from the wireless device 2 to the radio base station 1, and downlink (DL) communication, from the radio base station 1 to the wireless device 2 occur over a wireless radio interface 5. The radio conditions of the wireless radio interface 5 vary over time and also depend on the position of the wireless device 2, due to effects such as interference, fading, multipath propagation, etc. The core network 3 provides access to central functions in the mobile communication network and connectivity to other communication networks 8.

The mobile communications network 9 may comply with specifications for LTE (Long Term Evolution), for example, or with specifications for another current or future wireless network. The application of the presently disclosed techniques within an LTE network is described herein to fully illustrate a context in which embodiments presented herein can be applied. Nevertheless, the disclosed techniques may be applied to other networks, as long as the principles described hereinafter are applicable.

LTE uses Orthogonal Frequency Division Multiplexing (OFDM) in the downlink and Discrete Fourier Transform (DFT)-spread OFDM in the uplink. The basic LTE downlink physical resource can be viewed as a time-frequency grid.

Figure 2:
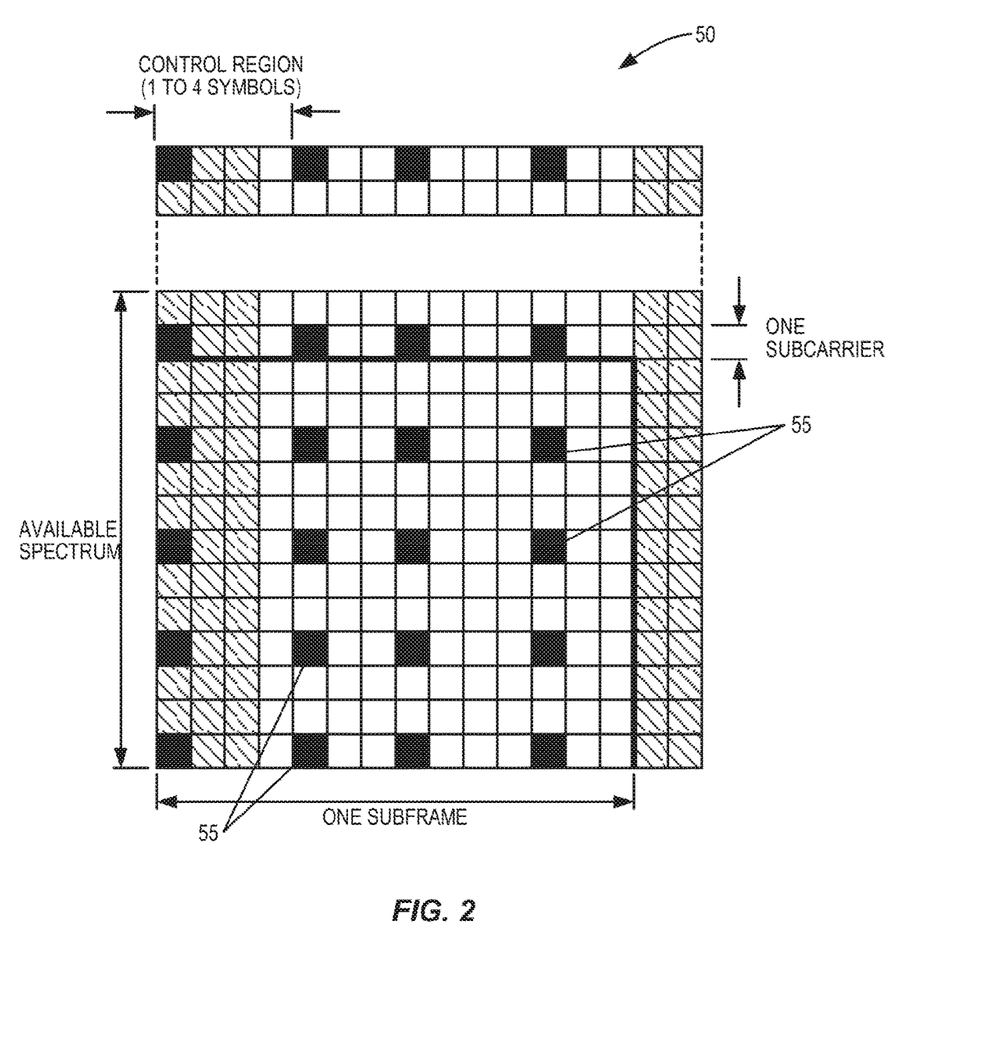
FIG. 2 illustrates details of a resource block (RB) pair in a Long-Term Evolution (LTE) subframe.

FIG. 2 illustrates a portion of the available spectrum of an exemplary OFDM time-frequency grid 50 for LTE. Generally speaking, the time-frequency grid 50 is divided into one-millisecond subframes. Each subframe includes a number of OFDM symbols. For a normal cyclic prefix (CP) length, suitable for use in situations where multipath dispersion is not expected to be extremely severe, a subframe consists of fourteen OFDM symbols. A subframe has only twelve OFDM symbols if an extended cyclic prefix is used. In the frequency domain, physical resources are divided into adjacent subcarriers with a spacing of 15 kHz. The number of subcarriers varies according to the allocated system bandwidth. The smallest element of the time-frequency grid 50 is a resource element. A resource element consists of one OFDM subcarrier during one OFDM symbol interval.

Resource elements are grouped into resource blocks, where each resource block in turn consists of twelve OFDM subcarriers, within one of two equal-length slots of a subframe. FIG. 2 illustrates a resource block pair, comprising a total of 168 resource elements. While FIG. 2 specifically illustrates a resource block pair in a downlink subframe, the physical structure is similar for uplink subframes.

Downlink transmissions are dynamically scheduled, in that in each subframe the base station transmits control information identifying the mobile terminals to which data is transmitted and the resource blocks in which that data is transmitted, for the current downlink subframe. This control signaling is typically transmitted in a control region, which occupies the first one, two, three, or four OFDM symbols in each subframe. A downlink resource block with a control region of three OFDM symbols is illustrated in FIG. 2. The dynamic scheduling information is communicated to the UEs ("user equipment," 3GPP terminology for a mobile station) via a Physical Downlink Control Channel (PDCCH) transmitted in the control region. After successful decoding of a PDCCH, the UE performs reception of traffic data from the Physical Downlink Shared Channel (PDSCH) or transmission of traffic data on the Physical Uplink Shared Channel (PUSCH), according to pre-determined timing specified in the LTE specifications.

Figure 3:
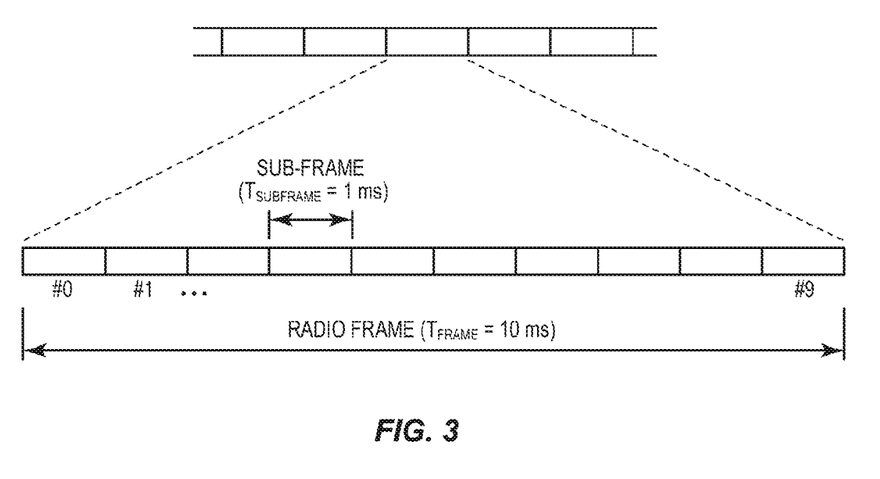
FIG. 3 illustrates the division of an LTE radio frame into ten subframes.

As shown in FIG. 3, LTE downlink transmissions are further organized into radio frames of 10 milliseconds, in the time domain, each radio frame consisting of ten subframes. Each subframe can further be divided into two slots of 0.5 milliseconds duration. Furthermore, resource allocations in LTE are often described in terms of resource blocks, where a resource block corresponds to one slot (0.5 ms) in the time domain and twelve contiguous subcarriers in the frequency domain. Resource blocks are numbered in the frequency domain, starting with 0 from one end of the system bandwidth.

Figure 4A:
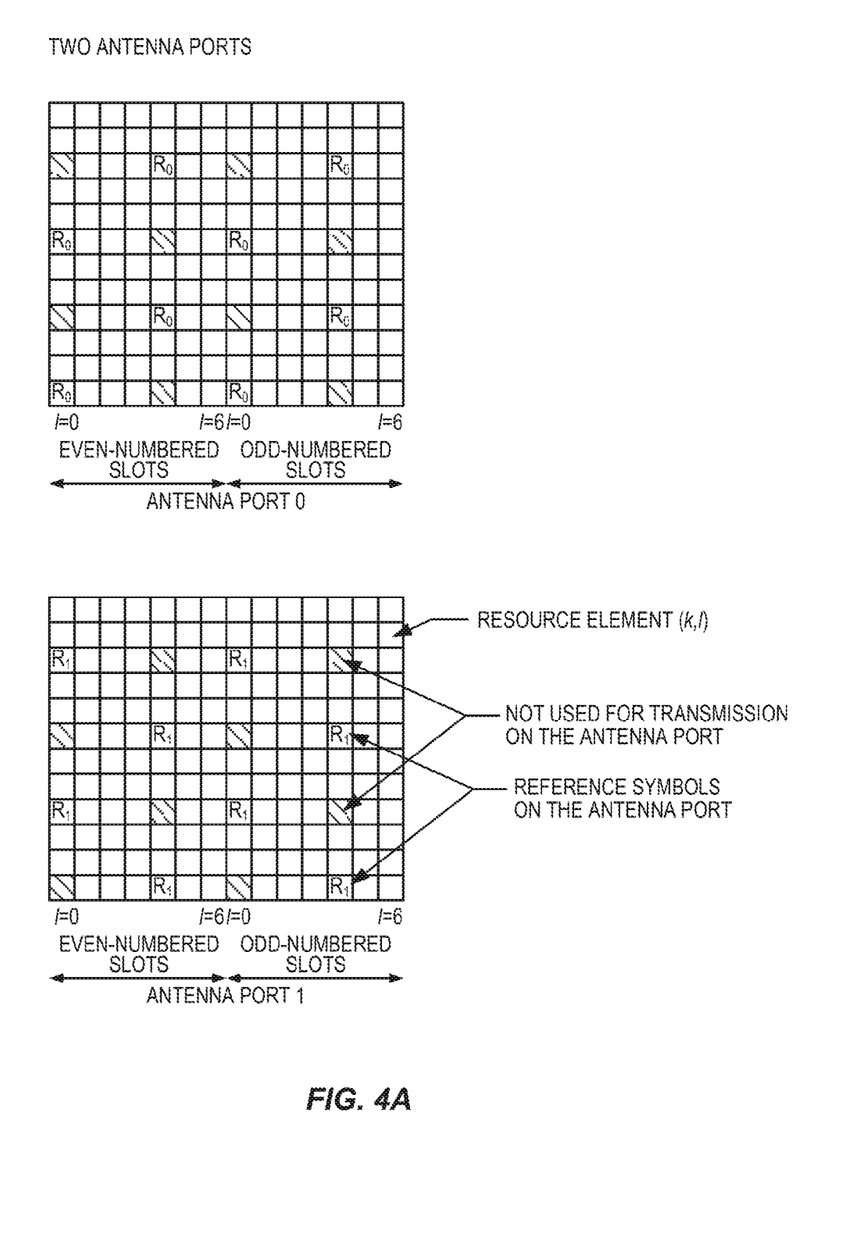
FIG. 4 shows the mapping of cell-specific reference symbols (CRS) to an RB pair for two-antenna-port and four-antenna-port configurations.
Figure 4B:
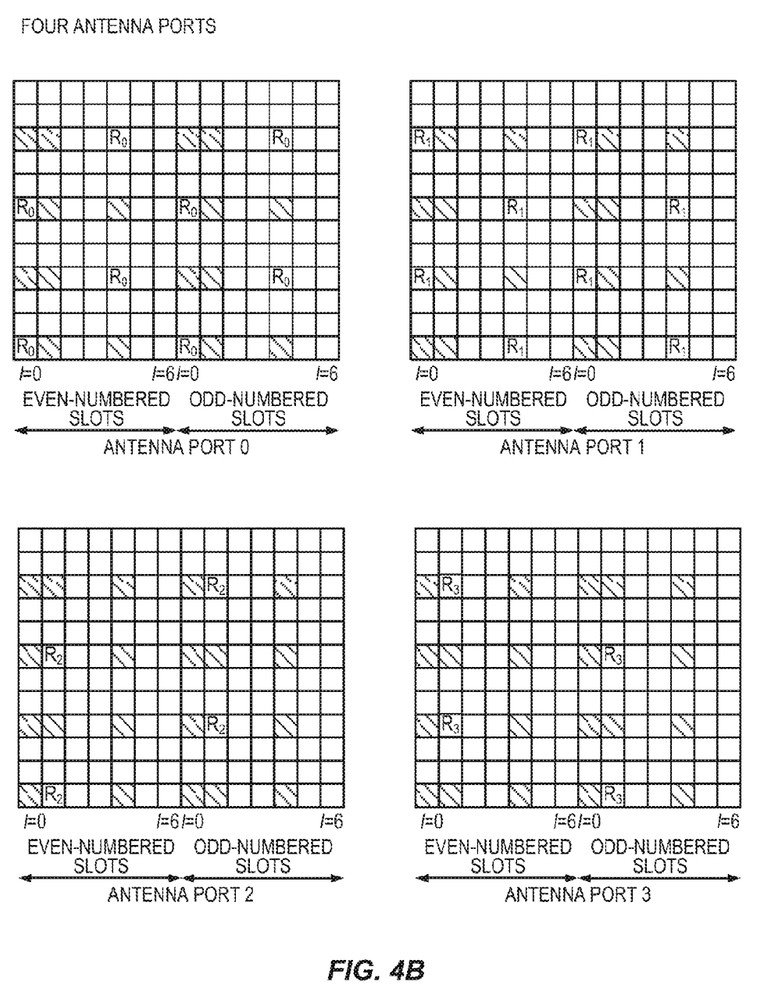

The signal transmitted by the eNB in a downlink (the link carrying transmissions from the eNB to the UE) subframe may be transmitted from multiple antennas and the signal may be received at a UE that has multiple antennas. The radio channel distorts the transmitted signals from the multiple antenna ports. In order to demodulate any transmissions on the downlink, a UE relies on reference symbols (RS) that are transmitted on the downlink. These reference symbols and their position in the time-frequency grid are known to the UE and hence can be used to determine channel estimates by measuring the effect of the radio channel on these symbols. In FIG. 2, an example distribution of reference symbols 55 is shown (for two-port transmission); reference symbols 55 make up a cell-specific reference signal (CRS). FIG. 4 illustrates the specific mapping of CRS for the two-antenna port and four-antenna port cases. It will be appreciated that the channel conditions specific to each antenna port can be evaluated by measuring the CRS corresponding to that antenna port.

Multiple-input multiple-output (MIMO) technologies are a range of advanced antenna techniques used to improve the spectral efficiency and thereby boost the overall system capacity. MIMO implies that both the base station and the UE ("user equipment"—3GPP terminology for an end user's wireless device, mobile terminal, mobile station, etc.) employ multiple antennas, although the term is sometimes used in a manner that includes scenarios in which only one end of the radio link uses multiple antennas. MIMO techniques are widely studied and applied in practice for downlink communications, i.e., from the base station to the mobile terminal, and are increasingly under consideration for uplink communications as well, i.e., from the mobile terminal to the base station.

There exist a variety of MIMO techniques or modes, including Per Antenna Rate Control (PARC), selective PARC (S-PARC), transmit diversity, receiver diversity, Double Transmit Antenna Array (D-TxAA), etc. The last of these, D-TxAA, is an advanced version of transmit diversity, which is already used in the Wideband-CDMA (WCDMA) networks developed by members of the 3rd-Generation Partnership Project (3GPP).

Irrespective of the particular MIMO technique under discussion, the notation (M×N) is generally used to represent MIMO configuration in terms of the number of transmit (M) and receive antennas (N). Common MIMO configurations used or currently discussed for various technologies are: (2×1), (1×2), (2×2), (4×2), (8×2) and (8×4). The configurations represented by (2×1) and (1×2) are special cases of MIMO, corresponding to techniques known as transmit diversity and receiver diversity, respectively.

The E-UTRAN ("Evolved Universal Terrestrial Radio Access Network," the air interface of 3GPP's Long Term Evolution (LTE) upgrade path for mobile networks, will support several MIMO schemes, including single-user MIMO (SU-MIMO), in which several spatially multiplexed transmission layers are targeted to or received from a single user terminal, and multi-user MIMO (MU-MIMO), in which each of several spatially multiplexed downlink layers are targeted to different user terminals.

The above-mentioned MIMO modes or other MIMO techniques enable spatial processing of the transmitted and received signals. In general, the spatial diversity provided by these techniques can be used to improve spectral efficiency, extend cell coverage, enhance user data rate, mitigate multi-user interference, etc. However, in practice each MIMO technique provides its own benefits. For instance, receiver diversity (1×2) particularly improves signal coverage. On the other hand (2×2) MIMO leads to increased peak user bit rate.

Ideally, 2×2 and 4×4 MIMO spatial multiplexing schemes may double and quadruple the data rate, respectively. Whether the data rate can actually be increased in practice depends on whether the spatial channels between the transmitter and receiver are sufficiently uncorrelated, so that the rank of the channel matrix is two, for 2×2 spatial multiplexing, or four, for 4×4 spatial multiplexing. (The rank is the number of independent rows or columns of the matrix.) In general, the average data rates for 2×2 and 4×4 MIMO will be lower than two times or four times the data rate achieved in single link conditions.

Multiple-Input Multiple-Output (MIMO) multi-antenna transmission schemes are a key element of the ongoing efforts to increase data throughput in LTE and other networks. However, MIMO activation leads to higher consumption of energy resources, particularly with respect to mobile terminal battery life. There is no point in having MIMO activated during time windows in which a mobile terminal is inactive or has very low traffic requirements, since MIMO operation will use extra resources that can lead to increased power consumption and interference.

To address this problem, techniques are disclosed to optimize the UE experience in MIMO mode while reducing resource consumption. These techniques may be used to vary, in a dynamic and intelligent fashion, the number of active antennas ports used for uplink or downlink transmissions, based on user data traffic size per period of time.

For example, for 2×2 MIMO (two antennas at each of the receiving and transmitting ends of a transmission link), if the downlink traffic is lower than a particular threshold, then only a single transmit (TX) antenna on the base station (eNB) end of the link will be configured for transmission of data to UE. At the same time, receiver antenna diversity, e.g., using two receive (RX) antennas, can be used to improve reception on UE side, especially in bad RF conditions. According to the techniques detailed herein, channel conditions are also used to determine the transmission mode, in addition to the throughput demands Therefore, the number of active antennas ports can be dynamically minimized when the UE is in a good RF environment, as determined from measurements characterizing the RF environment. The following discussion provides further details of a dynamic, intelligent algorithm for optimal antenna port activation/deactivation based on user traffic and based on RF conditions.

The solutions detailed herein provide for dynamic and intelligent transmission mode changes in normal UE operation in MIMO configuration. According to some of these solutions, for example, a UE deactivates one (or more) of its multiple antennas when the UE has entered an inactivity timer window or has low user plane traffic. Under these same conditions, one or more antennas on the eNB may also be deactivated. Low user plane traffic could be deduced from the buffer on the eNB or UE. When RF conditions are good and throughput requirements are low, a single antenna port is used on the eNodeB for downlink transmissions, for example, instead of the two (or more) antenna ports that may otherwise be used for multi-layer MIMO transmission. Likewise, on the UE side, a single antenna is used for uplink transmissions. In some embodiments, the particular antenna port used for the single-antenna transmissions may be chosen based on the last known RF conditions, i.e., where the antenna port with better RF measurements is chosen.

This approach will generally improve UE performance, as it will lower battery/resource usage. Throughput is not degraded, as this will be used only in good RF condition and when low traffic is occurring over a link. This approach will also leave the other antenna or antennas (TX or RX) for other uses, such as RF harvesting.

Throughput demand for the uplink or downlink may be evaluated, for example, on a subframe basis, where an LTE subframe occupies a 1 millisecond time slot. The throughput demand for a subframe (or other time interval) may be compared to a threshold to determine whether an uplink or downlink transmission mode should be changed. This threshold may in turn depend on the available capacity of an LTE subframe in the relevant direction (downlink or uplink).

An example throughput calculation follows, for a 20 MHz bandwidth in LTE, which corresponds to 100 available Orthogonal Frequency-Division Multiplexing (OFDM) resource blocks (RBs) per subframe. Each resource block consists of 12 subcarriers (at 15-kHZ spacing) and occupies a 0.5-millisecond slot (one-half of a subframe), yielding a total of 16,800 resource elements per subframe (12 subcarriers×7 OFDM symbols×100 RBs×2 slots).

Each RE can carry a modulation symbol. Assuming 64-QAM (64-ary quadrature amplitude modulation), each modulation symbol can carry six bits. Ignoring the fact that several of the REs in each RB block are reserved for reference symbols, the total number of bits that can be carried in a single subframe over a 20 MHz bandwidth is 100,800 (16,800 modulation symbols×6 bits/modulation symbol=100800 bits). So, the maximum possible data rate is theoretically 100.8 Mbps (100,800 bits per 1 millisecond). Since coding with a rate of ¾ is typically used, the actual maximum downlink throughput is 75 Mbps, for a single antenna port. For multi-layer MIMO transmission using spatial multiplexing, this rate can be multiplied by the number of layers (sometimes called "streams").

In practice, link adaptation is performed, whereby the modulation scheme and the coding rates are varied, depending on the channel quality. In LTE, the channel quality is characterized by a Channel Quality Indicator (CQI) index, and the modulation scheme and coding rate are together referred to as a "Modulation and Coding Scheme" (MCS). Table 1, below, shows an example of the coding efficiencies for each of several possible MCS, related to CQI, for each layer of a dual-antenna transmission with a 50-RB allocation. It will be appreciated that the raw number of bits per subframe (labeled "Binary Channel Bits per Subframe") and the actual information bit payload may be significantly less than the theoretical maximums, due to the overhead consumed by reference symbols and control signaling, as well as the resources consumed by cyclic redundancy checks and/or other error-detection or error-correction mechanisms.

TABLE 1

| CQI index | Modulation | Target code rate | Imcs | Information Bit Payload | Binary Channel Bits Per Sub-Frame |
|---|---|---|---|---|---|
| 0 | out of range | out of range | DTX | — | — |
| 1 | QPSK | 0.0762 | 0 | 1384 | 12000 |
| 2 | QPSK | 0.1172 | 0 | 1384 | 12000 |
| 3 | QPSK | 0.1885 | 2 | 2216 | 12000 |
| 4 | QPSK | 0.3008 | 4 | 3624 | 12000 |
| 5 | QPSK | 0.4385 | 6 | 5160 | 12000 |
| 6 | QPSK | 0.5879 | 8 | 6968 | 12000 |
| 7 | 16 QAM | 0.3691 | 11 | 8760 | 24000 |
| 8 | 16 QAM | 0.4785 | 13 | 11448 | 24000 |
| 9 | 16 QAM | 0.6016 | 15 | 14112 | 24000 |
| 10 | 64 QAM | 0.4551 | 18 | 16416 | 36000 |
| 11 | 64 QAM | 0.5537 | 20 | 19848 | 36000 |
| 12 | 64 QAM | 0.6504 | 22 | 22920 | 36000 |
| 13 | 64 QAM | 0.7539 | 24 | 27376 | 36000 |
| 14 | 64 QAM | 0.8525 | 26 | 30576 | 36000 |
| 15 | 64 QAM | 0.9258 | 27 | 31704 | 36000 |

Note:
Sub-frame#0 and #5 are not used for the corresponding requirement. The next sub-frame (i.e., sub-frame#1 or #6) shall be used for the retransmission.

As can be seen from the example table of payloads versus MCS given above, each subframe is transmitted according to an MCS, based on channel quality. Accordingly, the RF conditions for the uplink and/or downlink need to be taken into account when comparing how much data traffic is scheduled to the capacity of the link Thus, the throughput requirement threshold used to trigger antenna-port deactivation should account for the MCS to be scheduled. An example threshold for TX or RX antenna deactivation for 2×2 MIMO (e.g., for an MCS higher than 20) could be 5% of the subframe data capacity per 1 millisecond (for overall size of data traffic). To compensate for oddities in the RF environment, the MCS value used to estimate the capacity of the link may be reduced somewhat, compared to the MCS value that is actually anticipated, so that the frame would be resistant to error for single antenna use. In some cases it may also be necessary to account for whether the UE is in a long DRX cycle, so that it may be kept in that mode.

For 4×4 MIMO, supporting up to four simultaneous data streams, multiple thresholds can be set up in order to more effectively deactivate antenna ports. Table 2, below, shows an example of how the thresholds for deactivating transmit antennas might be calculated, for MCS higher than 20 and for 4×4 MIMO. Note that the threshold calculation is based on the capacity of the subframe, which in turn is based on the MCS, which in turn is based on the measured and/or estimated channel quality.

TABLE 2

| Thresholds for UE | Number of antennas deactivated for transmission over a period of time |
|---|---|
| Overall traffic less than 15% of the capacity of a single subframe/1 ms | 1 |
| Overall traffic less than 10% of the capacity of a single subframe/1 ms | 2 |
| Overall traffic less than 5% of the capacity of a single subframe/1 ms | 3 |

One aspect that should be taken into when setting threshold for data to deactivate antennas is the RB load between scheduled entities, as several UEs may be sharing the physical resources at any given time.

As suggested by the above discussion, energy consumption by a radio transceiver (whether in a mobile terminal or in a base station) can be improved, without adversely affecting the user experience, by selectively "down-shifting" from a multi-layer spatial multiplexing mode (such as 2×2 MIMO or 4×4 MIMO, based on channel conditions and throughput demands. According to this approach, for example, if a radio transceiver that supports two or more MIMO transmission and reception modes determines that channel conditions are good, and that the throughput demand for forward link transmissions from the radio transceiver to a remote wireless device are below a predetermined threshold, the radio transceiver can decide to change the current forward-link transmission mode from a first multi-layer mode (e.g., four-layer spatial multiplexing, using 4×4 MIMO) to a second multi-layer mode (e.g., two-layer spatial multiplexing, using 2×2 MIMO), thus effectively deactivating two transmit antennas and reducing energy consumption in the radio transceiver. If the forward-link throughput requirements are low enough, the radio transceiver may change to a single-layer transmission mode instead. As throughput requirements increase, or as RF conditions degrade, the radio transceiver may "up-shift" back to a transmission scheme that uses more layers and/or antennas.

This approach can be carried out simultaneously for each of the downlink and uplink Table 3 illustrates several possibilities for combinations of transmission modes for uplink and downlink transmission modes, given good RF conditions, for various uplink and throughput requirements, relative to corresponding uplink and downlink thresholds. In the illustrated example, single-layer (single antenna) and dual-layer (two antenna) transmissions can be supported in each link direction. It will be appreciated that a similar (but more extensive) table can be readily constructed for a system supporting three-layer or four-layer transmission in either or both directions. In that case, multiple thresholds are used to select among the various multi-layer options.

TABLE 3

| Uplink Traffic Size | Downlink Traffic Size | Transmission Modes - Uplink Downlink |
|---|---|---|
| Lower than uplink threshold | Lower than downlink threshold | Single-layer up/single-layer down |
| Lower than uplink threshold | Higher than downlink threshold | Single-layer up/multi-layer down |
| Higher than uplink threshold | Lower than downlink threshold | Multi-layer up/single-layer down |
| Higher than uplink threshold | Higher than downlink threshold | Multi-layer up/multi-layer down |

As shown in Table 3, when the user plane traffic is low, the number of antennas Tx/Rx can be allocated accordingly. Thus, for example, when the throughput requirements are significantly lower than the amount of data that can be readily carried in one sub-frame per millisecond, there is no point of splitting the data into two streams and using open-loop spatial multiplexing (OLSM) or even transmit diversity, if the channel conditions are good. Permitting the eNodeB and/or UE to disable one of its antennas in this manner allows the UE to consume less battery power and frees resources on the eNB side for use by other UEs. This approach will can also lower interference for neighboring UEs.

This technique can be illustrated with a simple example. Assume that there is a period of time where a user is browsing the web, requiring data throughputs of about 10 kilobits/second for the downlink Assume further that the user's device is connected to an LTE system supporting a 20 MHz bandwidth. In this case, a single subframe can easily carry 16 kilobits (each sub-frame takes about 1 millisecond). Assuming that the system is lightly loaded and that the channel conditions are good, the downlink to the user's device does not require spatial multiplexing or transmit diversity, and thus only one antenna port is needed at the eNodeB, since one subframe can handle the data. In this example, because the UE is receiving 10 kilobits/s for the downlink, and one stream of data can handle it for the downlink in the same time period, the data session won't finish any later that if MIMO were used instead.

However, assume further that the user's device is generating 1 Mbit/second of data on the uplink, for some reason. To support this, multi-layer transmission is needed, and two UE transmit antennas are activated. So, dynamic and intelligent allocation of antenna ports according to the present techniques would result, for this example, a single-layer transmission mode on the downlink and a dual-layer transmission (2×2 MIMO) on the uplink.

It should be appreciated that this approach can readily be extended for 4×4 MIMO.

The previous example is based on a simplified view of the LTE uplink and downlink, where only a single user's throughput needs are considered. Of course, in practice, multiple users are scheduled in a subframe. However, each RB (in a given spatial multiplexing layer) is allocated to only one user, in a given subframe. The throughput thresholds used to determine whether a given user's throughput requirements are low enough to justify deactivating one or more antennas should take into account the multi-user nature of LTE, and can, in some cases, even take into account the actual loading of the system.

Figure 5:
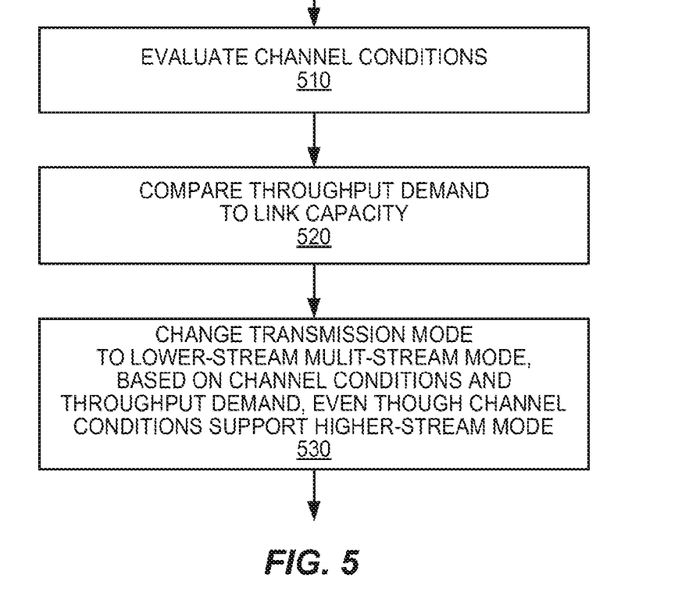
FIG. 5 is a process flow diagram illustrating an example method according to the techniques disclosed herein.

In view of the preceding description and examples, it will be appreciated that FIG. 5 is a process flow diagram illustrating a generalized method for dynamically and intelligently switching transmission modes, as implemented in a radio transceiver (such as in an eNB or a UE) that supports two or more MIMO transmission and reception modes. As shown at block 510, the method begins with evaluating channel conditions between the radio transceiver and a remote wireless device. This evaluating may comprise receiving and evaluating channel quality indicators sent by the remote wireless device, or measuring channel conditions based on reference symbols transmitted by the remote wireless device, or both. This evaluation may consider instantaneous RF conditions, i.e., the conditions applicable to a single subframe or a small group of subframes, or historical RF conditions, e.g., the average conditions for an interval comprising several subframes, or both. Parameters evaluated may include any one or more of CQI, BLER, and the like.

As seen at block 520, a throughput demand for the remote wireless device is compared to a forward link capacity or reverse link capacity, or both. In some embodiments, the throughput demand is determined by evaluating a forward link buffer corresponding to the remote wireless device, or by receiving and evaluating a buffer status report from the remote wireless device, or both. The forward link capacity or reverse link capacity may be determined based on a modulation and coding scheme (MCS) applicable to the relevant subframe or subframes, in some embodiments.

Based on the channel conditions and the throughput demand, a forward link transmission mode or a reverse link transmission mode, or both, is/are changed from a first multi-stream mode to a second multi-stream mode, the second multi-stream mode having fewer streams than the first multi-stream mode, even though channel conditions for the corresponding link support the first multi-stream mode. This is shown at block 530. In some embodiments, changing the forward link transmission mode or the reverse link transmission mode, or both, is based on determining that the throughput demand exceeds a predetermined fraction of a transmission-time-interval capacity. In some of these or in some other embodiments, changing the forward link transmission mode or the reverse link transmission mode, or both, is further based on an aggregate loading of the forward link or reverse link, or both.

In some embodiments, the first multi-stream mode is a four-stream spatial multiplexing mode and the second multi-stream mode is a two-stream spatial multiplexing mode. Thus, for example, the transceiver shifts from a four-stream to a two-stream mode, even though channel conditions are sufficient to support four streams, based on determining that the throughput requirements for the transceiver are below a threshold value.

In some embodiments, the process illustrated in FIG. 5 is carried out autonomously by a user equipment (UE), which determines on its own whether to switch transmission modes. In other embodiments, the evaluating and comparing shown at blocks 510 and 520 are carried out at an eNB, which subsequently directs the transceiver in the UE to change modes. Thus, in some embodiments, the process shown in FIG. 5 further comprises signaling the remote wireless device to switch from the first multi-stream mode to the second multi-stream mode for a subsequent reverse link transmission, and subsequently receiving data from the remote wireless device according to the second multi-stream mode.

In some embodiments, an eNB decides, based on the evaluating and comparing operations shown in FIG. 5, to change transmission mode for downlink transmissions. This change can be indicated to the UE via a downlink scheduling message. In these or similar embodiments, then, the process illustrated in FIG. 5 may comprise transmitting, to the remote wireless device, a forward link scheduling message indicating the change from the first multi-stream mode to the second multi-stream mode, and transmitting data to the remote wireless device according to the second multi-stream mode.

Figure 6:
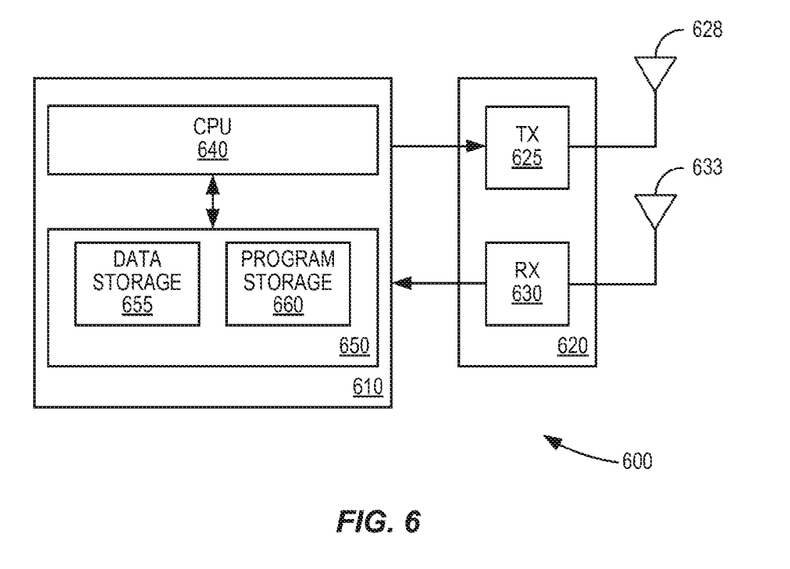
FIG. 6 is a block diagram illustrating components of an example radio transceiver.

The techniques and methods described above may be implemented using radio circuitry and electronic data processing circuitry provided in a radio transceiver. FIG. 6 illustrates features of an example radio transceiver 600 according to several embodiments of the present invention. Radio transceiver 600 may be part of a UE configured for operation with an LTE network (E-UTRAN), for example, or may be part of an LTE eNodeB. Although the detailed requirements for the components, subassemblies, etc., will differ depending on whether the radio transceiver 600 is part of a mobile terminal or a radio base station, the performance requirements for each are well known.

Whether forming part of a mobile terminal or a radio base station, radio transceiver 600 comprises a radio-frequency (RF) circuitry 620 configured to transmit radio signals to a remote node (e.g., a base station or one or more mobile terminals), as well as a processing circuit 610 for processing the signals transmitted and received by the RF circuitry 620. RF circuitry 620 includes a transmitter 625 coupled to two or more transmit antennas 628 and receiver 630 coupled to two or more receiver antennas 633. The same antenna(s) 628 and 633 may be used for both transmission and reception. Receiver 630 and transmitter 625 use known radio processing and signal processing components and techniques, typically according to a particular telecommunications standard such as the 3GPP standards for LTE. Note also that receiver 630 and transmitter 620 may each comprise separate radio and/or baseband circuitry for each of two or more different types of radio access network, such as radio/baseband circuitry adapted for E-UTRAN access and separate radio/baseband circuitry adapted for WiFi access. The same applies to the antennas—while in some cases one or more antennas may be used for accessing multiple types of networks, in other cases one or more antennas may be specifically adapted to a particular radio access network or networks. Because the various details and engineering tradeoffs associated with the design and implementation of such circuitry are well known and are unnecessary to a full understanding of the invention, additional details are not shown here.

Processing circuit 610 comprises one or more processors 640 coupled to one or more memory devices 650 that make up a data storage memory 655 and a program storage memory 660. Processor 640, identified as CPU 640 in FIG. 16, may be a microprocessor, microcontroller, or digital signal processor, in some embodiments. More generally, processing circuit 610 may comprise a processor/firmware combination, or specialized digital hardware, or a combination thereof. Memory 650 may comprise one or several types of memory such as read-only memory (ROM), random-access memory, cache memory, flash memory devices, optical storage devices, etc. Because radio transceiver 600 may support multiple radio access networks, processing circuit 610 may include separate processing resources dedicated to one or several radio access technologies, in some embodiments. Again, because the various details and engineering tradeoffs associated with the design of baseband processing circuitry for mobile devices are well known and are unnecessary to a full understanding of the invention, additional details are not shown here.

Typical functions of the processing circuit 610 include modulation and coding of transmitted signals and the demodulation and decoding of received signals. In several embodiments of the present invention, processing circuit 610 is adapted, using suitable program code stored in program storage memory 660, for example, to carry out one of the techniques described above, e.g., according to the technique illustrated in FIG. 5 and variants thereof. Of course, it will be appreciated that not all of the steps of these techniques are necessarily performed in a single microprocessor or even in a single module.

Accordingly, in some embodiments the processing circuit 610 is configured to: control the RF circuitry 620 and to evaluate channel conditions between the radio transceiver and a remote wireless device; compare a throughput demand for the remote wireless device to a forward link capacity or reverse link capacity, or both; and, based on the channel conditions and the throughput demand, change a forward link transmission mode or a reverse link transmission mode, or both, from a first multi-stream mode to a second multi-stream mode, the second multi-stream mode having fewer streams than the first multi-stream mode, despite that channel conditions for the corresponding link support the first multi-stream mode.

All of the variations described above, e.g., in connection with FIG. 5, are applicable to the radio transceiver 600 illustrated in FIG. 6.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, in a radio transceiver that supports two or more Multiple-Input Multiple-Output (MIMO) transmission and reception modes, the method comprising:
   evaluating channel conditions between the radio transceiver and a remote wireless device;
   comparing a throughput demand for the remote wireless device to a forward link capacity or reverse link capacity, or both;
   based on the channel conditions and the comparing of the throughput demand to the forward link capacity or reverse link capacity, or both, changing a forward link transmission mode or a reverse link transmission mode, or both, from a first multi-stream mode to a second multi-stream mode, the second multi-stream mode having fewer streams than the first multi-stream mode, despite that channel conditions for the corresponding link support the first multi-stream mode.

2. The method of claim 1, wherein the first multi-stream mode is a four-stream spatial multiplexing mode and the second multi-stream mode is a two-stream spatial multiplexing mode.

3. The method of claim 1, further comprising signaling the remote wireless device to switch from the first multi-stream mode to the second multi-stream mode for a subsequent reverse link transmission, and subsequently receiving data from the remote wireless device according to the second multi-stream mode.

4. The method of claim 1, further comprising transmitting, to the remote wireless device, a forward link scheduling message indicating the change from the first multi-stream mode to the second multi-stream mode, and transmitting data to the remote wireless device according to the second multi-stream mode.

5. The method of claim 1, wherein evaluating channel conditions between the radio transceiver and a remote wireless device comprises receiving and evaluating channel quality indicators sent by the remote wireless device, or measuring channel conditions based on reference symbols transmitted by the remote wireless device, or both.

6. The method of claim 1, further comprising determining the throughput demand by evaluating a forward link buffer corresponding to the remote wireless device, or by receiving and evaluating a buffer status report from the remote wireless device, or both.

7. The method of claim 1, wherein changing the forward link transmission mode or the reverse link transmission mode, or both, is based on determining that the throughput demand exceeds a predetermined fraction of a transmission-time-interval capacity.

8. The method of claim 1, wherein changing the forward link transmission mode or the reverse link transmission mode, or both, is further based on an aggregate loading of the forward link or reverse link, or both.

9. A radio transceiver, comprising
   radio-frequency (RF) circuitry configured to support two or more Multiple-Input Multiple-Output (MIMO) transmission and reception modes, and
   a processing circuit configured to control the RF circuitry and to:
   evaluate channel conditions between the radio transceiver and a remote wireless device;
   compare a throughput demand for the remote wireless device to a forward link capacity or reverse link capacity, or both; and,
   based on the channel conditions and the comparing of the throughput demand to the forward link capacity or reverse link capacity, or both, change a forward link transmission mode or a reverse link transmission mode, or both, from a first multi-stream mode to a second multi-stream mode, the second multi-stream mode having fewer streams than the first multi-stream mode, despite that channel conditions for the corresponding link support the first multi-stream mode.

10. The radio transceiver of claim 9, wherein the first multi-stream mode is a four-stream spatial multiplexing mode and the second multi-stream mode is a two-stream spatial multiplexing mode.

11. The radio transceiver of claim 9, wherein the processing circuit is further configured to control the RF circuitry to signal the remote wireless device to switch from the first multi-stream mode to the second multi-stream mode for a subsequent reverse link transmission, and to subsequently receive data from the remote wireless device according to the second multi-stream mode.

12. The radio transceiver of claim 9, wherein the processing circuit is further configured to control the RF circuitry to transmit, to the remote wireless device, a forward link scheduling message indicating the change from the first multi-stream mode to the second multi-stream mode, and to transmit data to the remote wireless device according to the second multi-stream mode.

13. The radio transceiver of claim 9, wherein the processing circuit is configured to evaluate channel conditions between the radio transceiver and a remote wireless device by receiving and evaluating channel quality indicators sent by the remote wireless device, or by measuring channel conditions based on reference symbols transmitted by the remote wireless device, or both.

14. The radio transceiver of claim 9, wherein the processing circuit is configured to determine the throughput demand by evaluating a forward link buffer corresponding to the remote wireless device, or by receiving and evaluating a buffer status report from the remote wireless device, or both.

15. The radio transceiver of claim 9, wherein the processing circuit is configured to change the forward link transmission mode or the reverse link transmission mode, or both, based on determining that the throughput demand exceeds a predetermined fraction of a transmission-time-interval capacity.

16. The radio transceiver of claim 9, wherein the processing circuit is configured to change the forward link transmission mode or the reverse link transmission mode, or both, based further on an aggregate loading of the forward link or reverse link, or both.

* * * * *

UNITED STATES PATENT AND TRADEMARK OFFICE
CERTIFICATE OF CORRECTION

| | | |
|---|---|---|
| PATENT NO. | : 9,698,876 B2 | |
| APPLICATION NO. | : 14/906460 | |
| DATED | : July 4, 2017 | |
| INVENTOR(S) | : El-Najjar et al. | |

It is certified that error appears in the above-identified patent and that said Letters Patent is hereby corrected as shown below:

On the Title Page

In Item (72), under "Inventors", in Column 1, Line 2, delete "Whitter," and insert -- Whittier, --, therefor.

On Page 2, in Item (56), under "U.S. PATENT DOCUMENTS", in Column 2, Line 4, delete "Luz" and insert -- Luz et al. --, therefor.

In the Specification

In Column 1, Line 23, delete "Indicator," and insert -- Indicator (RI), --, therefor.

In Column 1, Line 29, delete "equipment"" and insert -- equipments" --, therefor.

In Column 2, Line 12, delete "Block-Error" and insert -- Block Level Error --, therefor.

In Column 3, Line 54, delete "(ASIC)" and insert -- (ASIC(s)) --, therefor.

In Column 5, Line 33, delete "equipment,"" and insert -- equipments," --, therefor.

In Column 6, Line 36, delete "Network,"" and insert -- Network,") --, therefor.

In Column 7, Line 24, delete "demands Therefore," and insert -- demands. Therefore, --, therefor.

In Column 8, Line 63, delete "link" and insert -- link. --, therefor.

In Column 9, Line 40, delete "MIMO," and insert -- MIMO), --, therefor.

In Column 9, Line 61, delete "uplink Table" and insert -- uplink. Table --, therefor.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,698,876 B2

In Column 10, Line 37, delete "downlink Assume" and insert -- downlink. Assume --, therefor.

In Column 12, Line 28, delete "radio-frequency" and insert -- radio frequency --, therefor.

In Column 12, Line 41, delete "transmitter 620" and insert -- transmitter 625 --, therefor.

In Column 12, Lines 58-59, delete "FIG. 16," and insert -- FIG. 6, --, therefor.

In the Claims

In Column 14, Line 33, in Claim 9, delete "comprising" and insert -- comprising: --, therefor.

In Column 14, Line 34, in Claim 9, delete "radio-frequency" and insert -- radio frequency --, therefor.